(12) United States Patent
Chandra et al.

(10) Patent No.: US 7,248,594 B2
(45) Date of Patent: Jul. 24, 2007

(54) EFFICIENT MULTI-THREADED MULTI-PROCESSOR SCHEDULING IMPLEMENTATION

(75) Inventors: Prashant R Chandra, Sunnyvale, CA (US); Alok Kumar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1039 days.

(21) Appl. No.: 10/170,409

(22) Filed: Jun. 14, 2002

(65) Prior Publication Data

US 2003/0231645 A1 Dec. 18, 2003

(51) Int. Cl.
*H04L 12/56* (2006.01)

(52) U.S. Cl. ................ 370/412; 370/413; 711/100

(58) Field of Classification Search ............... None
See application file for complete search history.

(56) References Cited

U.S. PATENT DOCUMENTS

| | | | | |
|---|---|---|---|---|
| 6,978,460 | B2 * | 12/2005 | Arakawa ............... | 718/103 |
| 2002/0021707 | A1 * | 2/2002 | Sampath et al. ........... | 370/412 |
| 2003/0018691 | A1 * | 1/2003 | Bono .................. | 709/106 |
| 2003/0133406 | A1 * | 7/2003 | Fawaz et al. ............ | 370/229 |

\* cited by examiner

*Primary Examiner*—Duc Ho
(74) *Attorney, Agent, or Firm*—Erik R. Nordstrom (57) ABSTRACT

A system and method of scheduling packets in a multi-threaded, multiprocessor network architecture provides enhanced speed and performance. The architecture involves a scheduler thread that transitions between queues in response to a depletion of queues by a weighted amount, a plurality of transmit threads that deplete the queues by the size of packets transmitted and a plurality of receive threads that initialize the weights for idle queues.

33 Claims, 8 Drawing Sheets

EFFICIENT MULTI-THREADED MULTI-PROCESSOR SCHEDULING IMPLEMENTATION

BACKGROUND

1. Technical Field

Embodiments of the present invention generally relate to computer processors. More particularly, embodiments relate to packet scheduling in network processors.

2. Discussion

In the highly competitive computer industry, the trend toward faster processing speeds and increased functionality is well documented. While this trend is desirable to the consumer, it presents significant challenges to processor designers as well as manufacturers. A particular challenge relates to the processing of packets by network processors. For example, a wide variety of applications such as multi-layer local area network (LAN) switches, multi-protocol telecommunications products, broadband cable products, remote access devices and intelligent peripheral component interconnect (PCI version 2.2, PCI Special Interest Group) adapters use one or more network processors to receive and transmit packets/cells/frames. Network processors typically have one or more microengine processors optimized for high-speed packet processing. Each microengine has multiple hardware threads. A network processor also typically has a general purpose processor on chip. Thus, in a network processor, a receive thread on a microengine will often transfer each packet from a receive buffer of the network processor to one of a plurality of queues contained in an off-chip memory such as a synchronous dynamic random access memory (SDRAM). Queue descriptor data is stored in a somewhat faster off-chip memory such as a static RAM (SRAM).

Each queue may have an associated type of service (TOS) ranging from network control, which typically has the highest priority to best-effort TOS, which often has the lowest priority. Information stored in the packet headers can identify the appropriate TOS for the packet to obtain what is sometimes referred to as "differentiated service" approach.

Once the packets are assembled in the DRAM, either the general purpose on chip processor, or one or more microengines classify and/or modify the packets for transmission back out of the network processor. A microengine transmit thread determines the queues from which to consume packets based on queue priority and/or a set of scheduling rules. A number of scheduling techniques have evolved in recent years in order to determine when the transmit thread is to transition from one queue to another.

Figure 9:
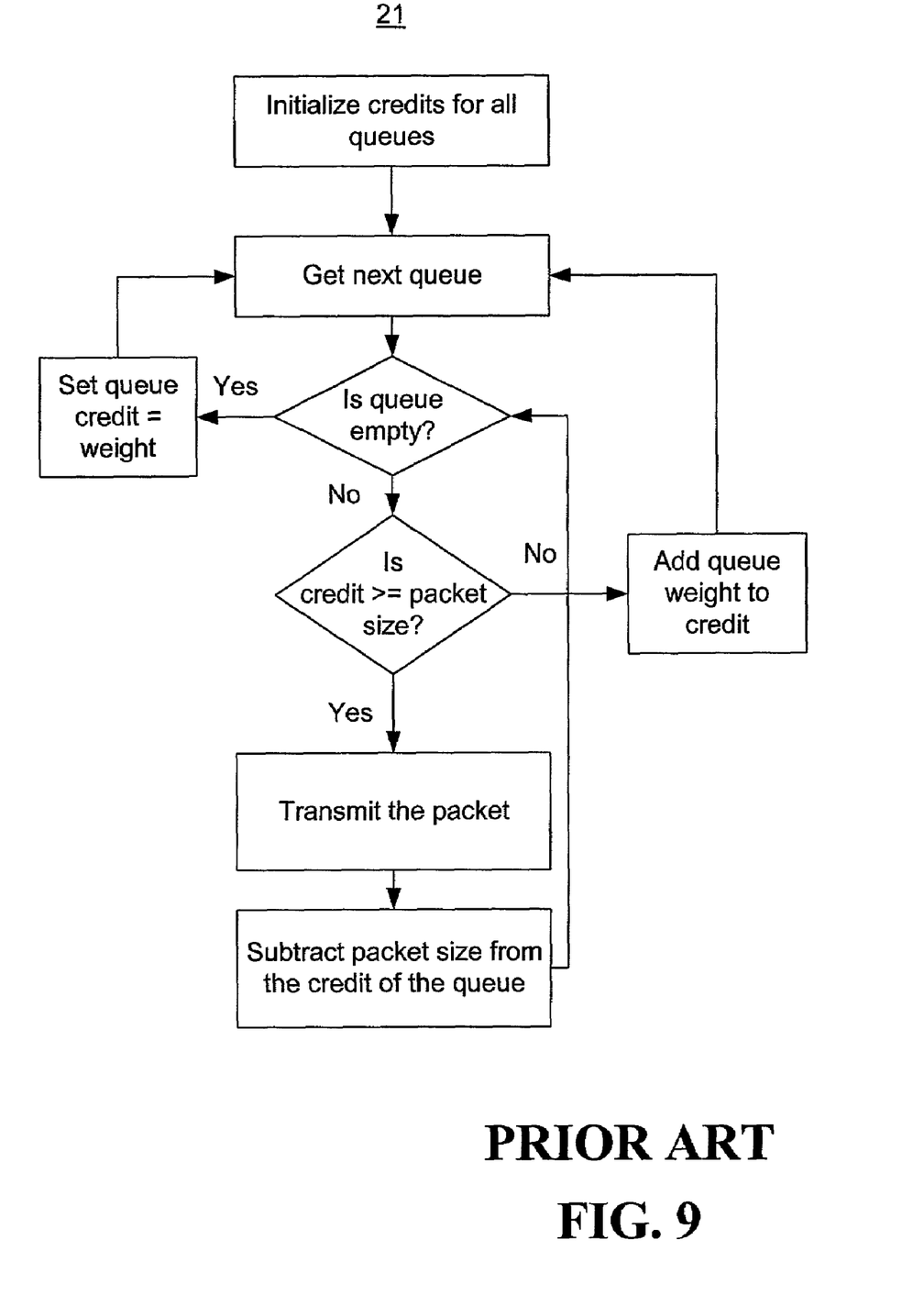
FIG. 9 is a flowchart of an example of a conventional deficit round robin approach to queue transition.
Figure 10:
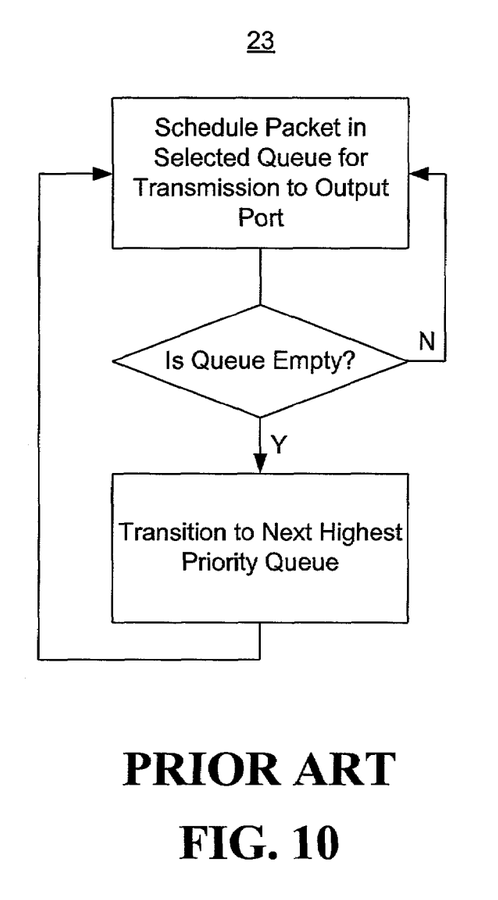
FIG. 10 is a flowchart of an example of a conventional strict priority approach to queue transition.
Figure 11:
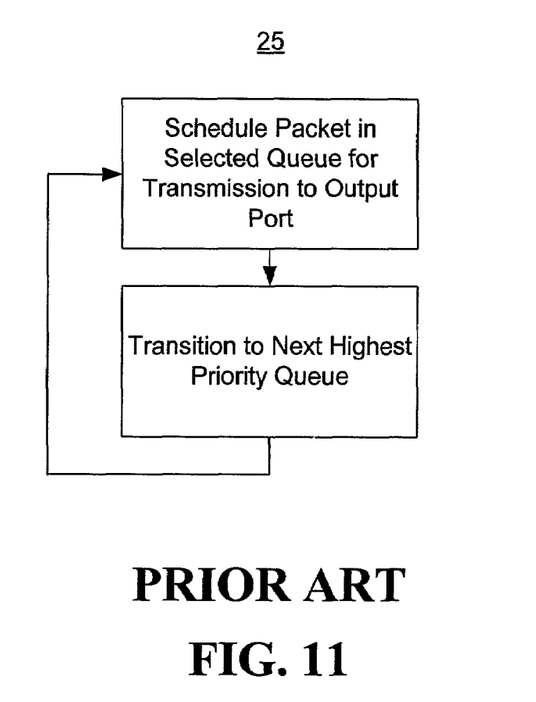
FIG. 11 is a flowchart of an example of a conventional round robin approach to queue transition.

One queue transition approach follows a strict priority rule, in which the highest priority queue must be empty before packets will be transmitted from the next highest priority queue. This technique is shown in FIG. 10 at method 23 and can result in insufficient consumption from the lower priority queues or "starvation". Such a result can become particularly acute in processing environments having heavy packet traffic. Another technique is to transition between the queues in a "Round Robin" fashion, in which one packet is transmitted from each queue, regardless of priority. FIG. 11 illustrates a conventional Round Robin approach at method 25. While the Round Robin technique can be useful in certain circumstances, the inherent disregard for queue priority can lead to significant unfairness in bandwidth allocation. Yet another technique has been to deplete each queue by a weighted amount depending upon the respective type of service and is described in "Efficient Fair Queuing using Deficit Round Robin", M. Shreedhar et al., ACM SIGCOMM '95. FIG. 9 shows a conventional Deficit Round Robin (DRR) approach at method 21. While conventional DRR can address some of the shortcomings associated with conventional scheduling techniques, certain implementation difficulties remain.

The conventional DRR implementation shown in FIG. 9 is a single-threaded implementation that is suitable for a general purpose processor. However, general purpose processors are significantly slower than multi-threaded, multi-processor network processors in processing and scheduling packets. For example, one commercially available network processor uses as many as sixteen receive threads and six transmit threads to populate and read from the plurality of queues. Each queue is therefore shared by multiple threads. A DRR implementation that scales to high-speeds is therefore required for multi-threaded multiprocessor network processor architectures. Such an implementation would require the sharing of queue descriptors between multiple threads. Furthermore, the priority information is stored along with the queue descriptors in an off-chip location. As a result, a considerable amount of processing time can be expended in making the determination of whether to transition to the next queue. There is therefore a need for a system and method of processing packets in a multi-threaded multi-processor architecture that accounts for queue priority without sacrificing speed or performance.

BRIEF DESCRIPTION OF THE DRAWINGS

The various advantages of embodiments of the present invention will become apparent to one skilled in the art by reading the following specification and appended claims, and by referencing the following drawings, in which:

DETAILED DESCRIPTION

Figure 1:
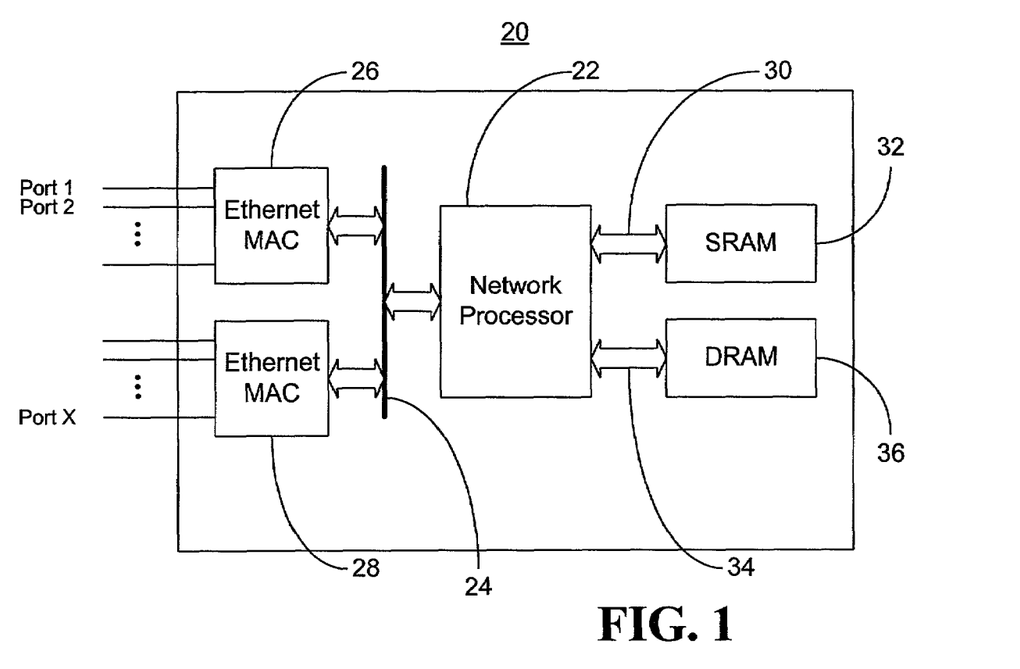
FIG. 1 is a block diagram of an example of a networking architecture in accordance with one embodiment of the invention.

FIG. 1 shows a networking blade architecture 20 in which a network processor 22 communicates over a bus 24 with a number of Ethernet media access controllers (MACs) 26, 28 in order to classify, modify and otherwise process packets presented at ports 1-X. The network processor 22 also communicates over static random access memory (SRAM) bus 30 with SRAM 32, and over synchronous dynamic RAM (SDRAM) bus 34 with SDRAM 36. Although Ethernet MACs (Institute of Electrical and Electronics Engineers, 802.3) are illustrated, it should be noted that other network processing devices may be used.

Thus, the architecture 20 can be used in a number of applications such as routers, multi-layer local area network (LAN) switches, multi-protocol telecommunications products, broadband cable products, remote access devices, and intelligent peripheral component interconnect (PCI) adapters, etc. While the examples described herein will be primarily discussed with regard to Internet protocol (IP) packet routing, it should be noted that the embodiments of the invention are not so limited. In fact, the embodiments can be useful in asynchronous transfer mode (ATM) cell architectures, framing architectures, and any other networking application in which performance and Quality of Service (QoS) are issues of concern. Notwithstanding, there are a number of aspects of IP networking for which the embodiments are uniquely suited.

Figure 2:
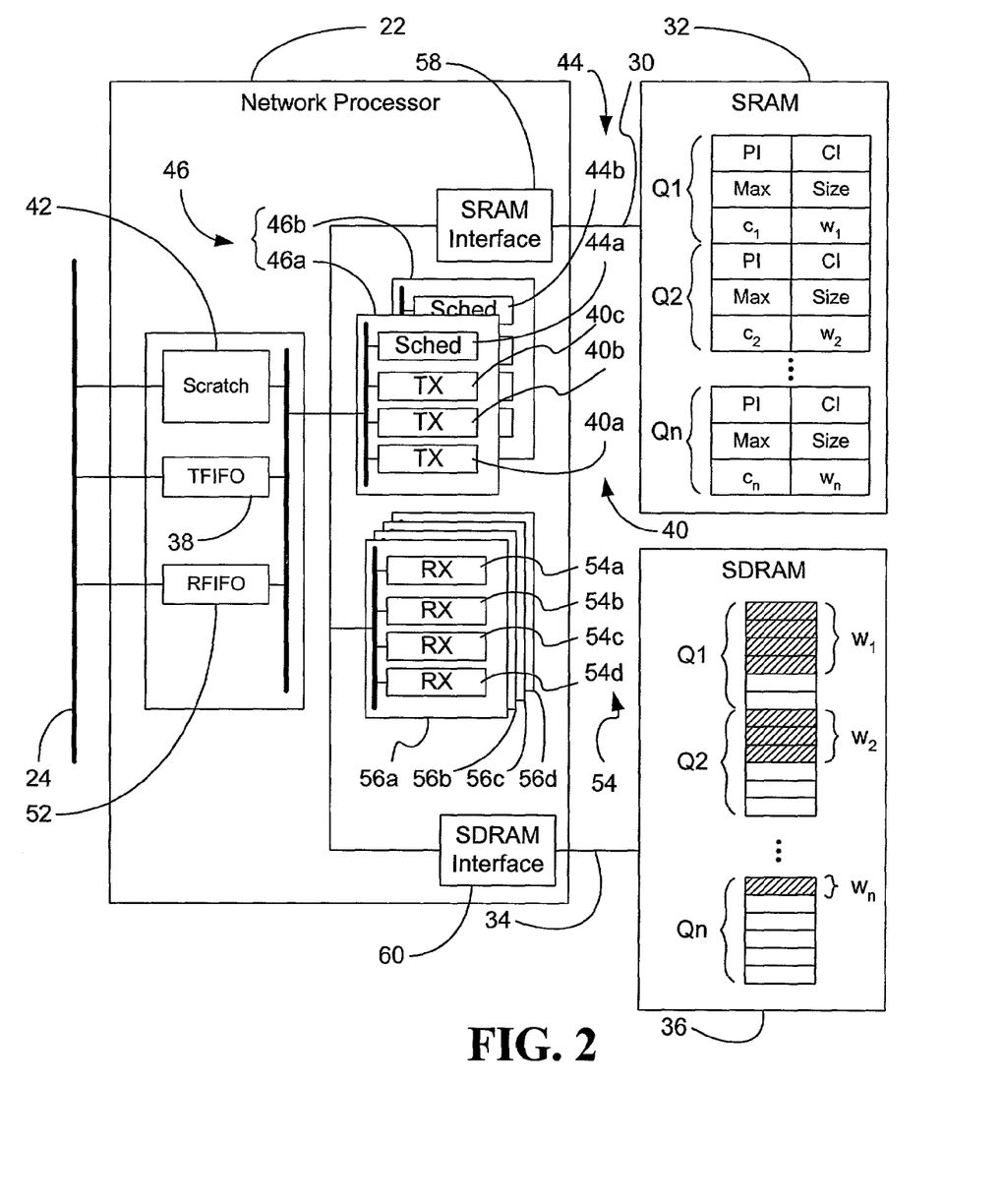
FIG. 2 is a block diagram of an example of a network processor and off-chip memories in accordance with one embodiment of the invention.

Turning now to FIG. 2, one approach to the architecture associated with network processor 22 is shown in greater detail. Generally, a first off-chip memory, SDRAM 36, has a plurality of queues indicated by Q1, Q2–Qn. While any number of queues may be used, the well known differentiated services standard provides for at least six levels of prioritization—one expedited forwarding class, six assured forwarding classes and one best-effort class. A second off-chip memory, SRAM 32, stores a credit descriptor and a weight descriptor for each queue. The weight descriptors are indicated by $w_1$, $w_2$–$w_n$, and define weighted amounts based on the type of service (TOS) associated with the respective queue. The credit descriptors, shown as $c_1$, $c_2$–$c_n$, indicate whether the queues have been depleted by the weighted amounts. The network processor 22 is operatively coupled to the SDRAM 36 through SDRAM interface 60, and to the SRAM 32 through SRAM interface 58, and includes a transmit buffer 38 and a plurality of transmit threads 40. The transmit threads 40 transfer packets from the queues in the SDRAM 36 to the transmit buffer 38, and transition between the queues in response to a depletion of the queues by the weighted amounts.

By way of example, Q1 is the highest priority queue and has a weighted amount $w_1$ of four maximum sized packets, while Qn has the lowest priority and therefore has a weighted amount $w_n$ of only one maximum sized packet. Thus, the transmit threads 40 will consume from Q1 until the queue has been depleted by four maximum sized packets and then will consume from Q2 for three maximum sized packets, and so on. It will therefore be appreciated that by relying on the weighted amounts, a technique can be achieved that avoids the starvation difficulties associated with conventional strict priority approaches and the inflexibility associated with convention Round Robin approaches.

Figure 3:
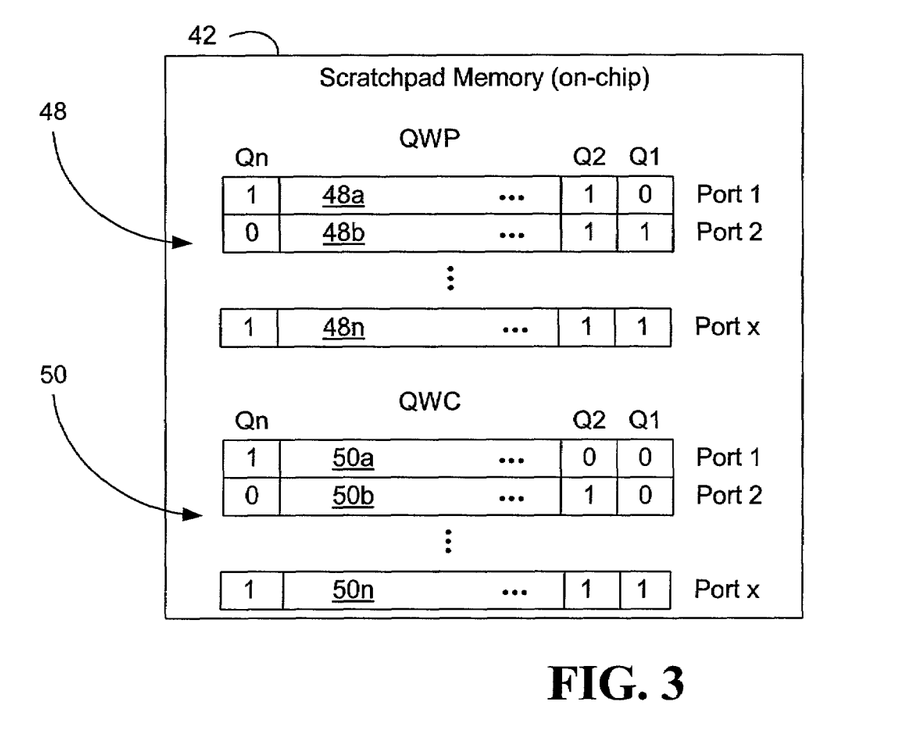
FIG. 3 is a block diagram of an example of an on-chip memory in accordance with one embodiment of the invention.

The network processor 22 further includes an on-chip memory such as scratchpad 42 and a scheduler thread 44. The scheduler thread 44 selects transmit threads 40 for packet transmission, and in the illustrated embodiment, a plurality of transmit micro-engines 46 are each provided with one scheduler thread 44 and three transmit threads 40. As best seen in FIG. 3, the scratchpad 42 has a queues with packets (QWP) vector 48 and a queues with credit (QWC) vector 50, where each vector 48, 50 has a plurality of bits corresponding to the plurality of queues. Thus, if eight queues are used, the vectors 48, 50 have eight bits. By maintaining the vectors 48, 50 in the on-chip scratchpad 42, the transmit threads 40 (FIG. 2) are able to determine when to transition from queue-to-queue without having to access off-chip memory SRAM 32 (FIG. 2). While the vectors 48,50 are shown as having a plurality of bits corresponding to the plurality of queues, other configurations are possible.

Figure 4:
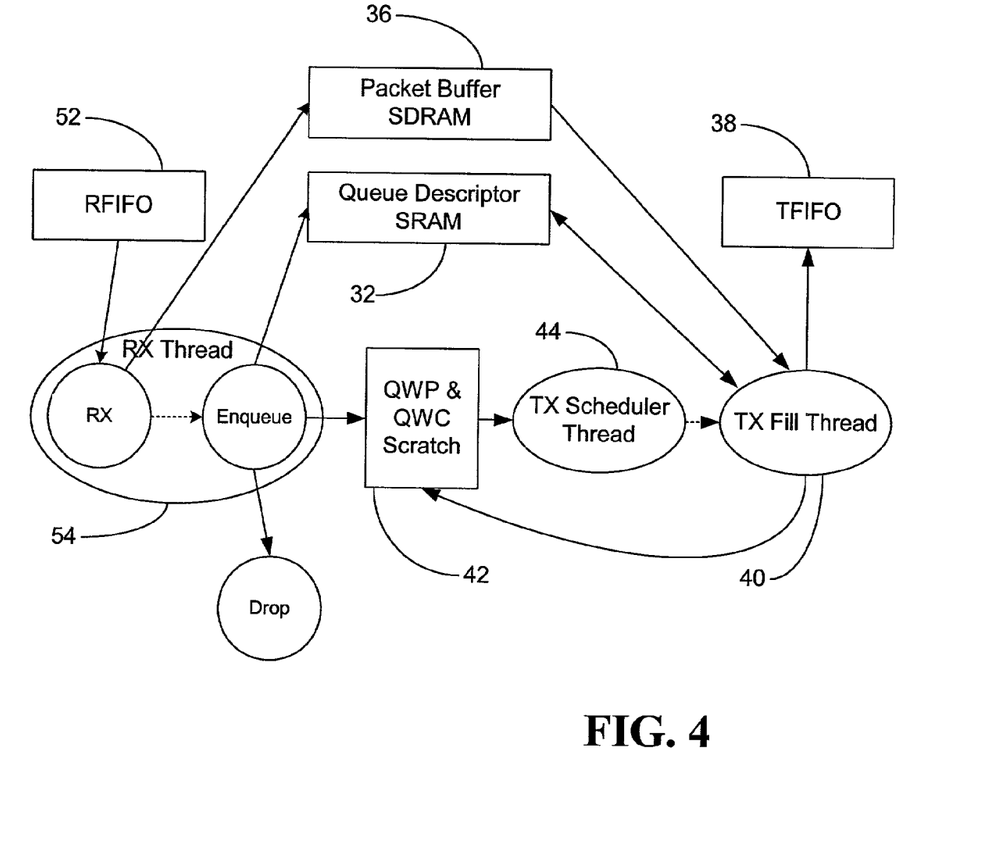
FIG. 4 is a data flow diagram of an example of a packet enqueuing and dequeuing process in accordance with one embodiment of the invention.

Returning now to FIG. 2, the network processor 22 also includes a receive buffer 52 and a plurality of receive threads 54. The receive threads 54 transfer the packets from the receive buffer 52 to the plurality of queues in SDRAM 36, and update the appropriate QWP vector 48 (FIG. 3) in scratchpad 42. The receive threads 54 may also be partitioned into a plurality of receive micro-engines 56. FIG. 4 further demonstrates the process of enqueuing packets from the receive buffer 52 and dequeuing packets to the transmit buffer 38.

Figure 5:
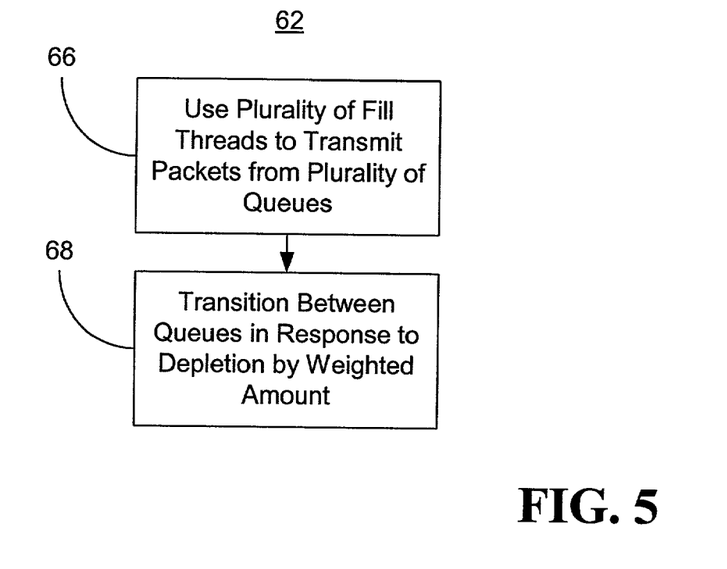
FIG. 5 is a flowchart of an example of a method of processing packets in accordance with one embodiment of the invention.

Turning now to FIG. 5, a method of processing packets is shown generally at 62. Processing block 66 provides for using the plurality of transmit threads to transmit packets from a plurality of queues of a first off-chip memory to a transmit buffer. As seen in block 68, the transmit threads transition between the queues in response to a depletion of each queue by a weighted amount. Thus, method 62 enables packets to be dequeued efficiently in a multi-threaded architecture.

Figure 6:
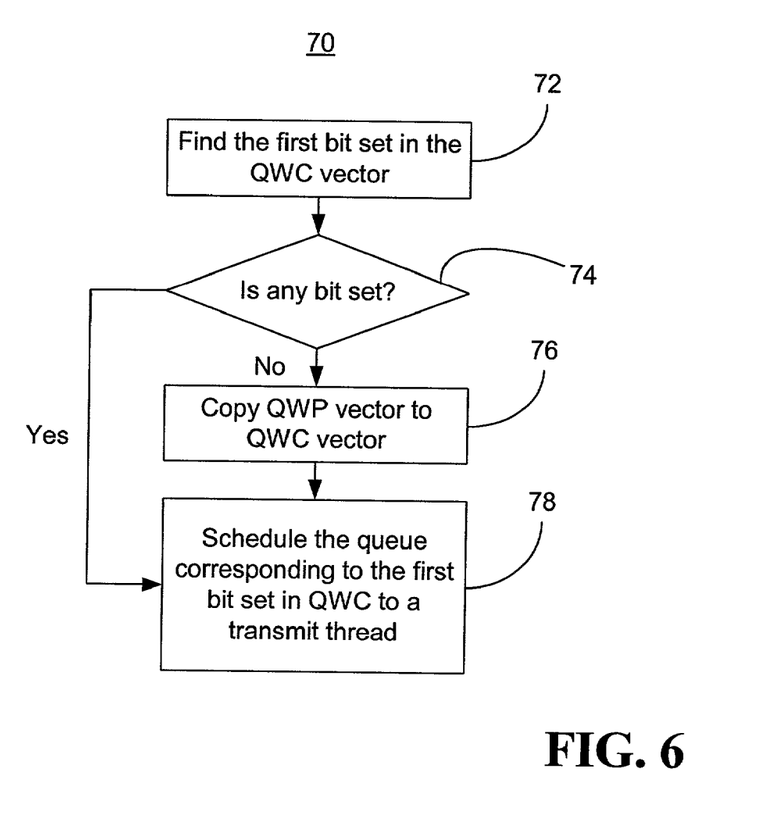
FIG. 6 is a flowchart of an example of a method of processing packets in accordance with one embodiment of the invention.

FIG. 6 demonstrates a scheduling process in greater detail at method 70. Method 70 can be implemented by the scheduler thread to efficiently schedule packets in an environment in which multiple queues are shared by multiple threads. Specifically, processing block 72 provides for finding the first bit in the QWC vector that is set. It will be appreciated that the end of a round is indicated whenever the QWC vector goes to zero.

If it is determined at block 74 that no bits in the QWC vector are set, the QWP vector is copied to the QWC vector at block 76. It is assumed that there will be no packet larger in size than the weight of the queue. Thus, at least one packet is transmitted from each non-empty queue in each round, and each queue with packets will have credit to transmit a packet at the start of a round. If it is determined at block 74 that the QWC vector is not zero, the scheduler thread transitions directly to block 78 and schedules a transmit thread for transmission of the data in the queue corresponding to the first bit set in the QWC. It is important to note that the QWC and QWP vectors are maintained in on-chip scratch pad memory in this embodiment and therefore can be accessed much faster than under conventional approaches.

Figure 7:
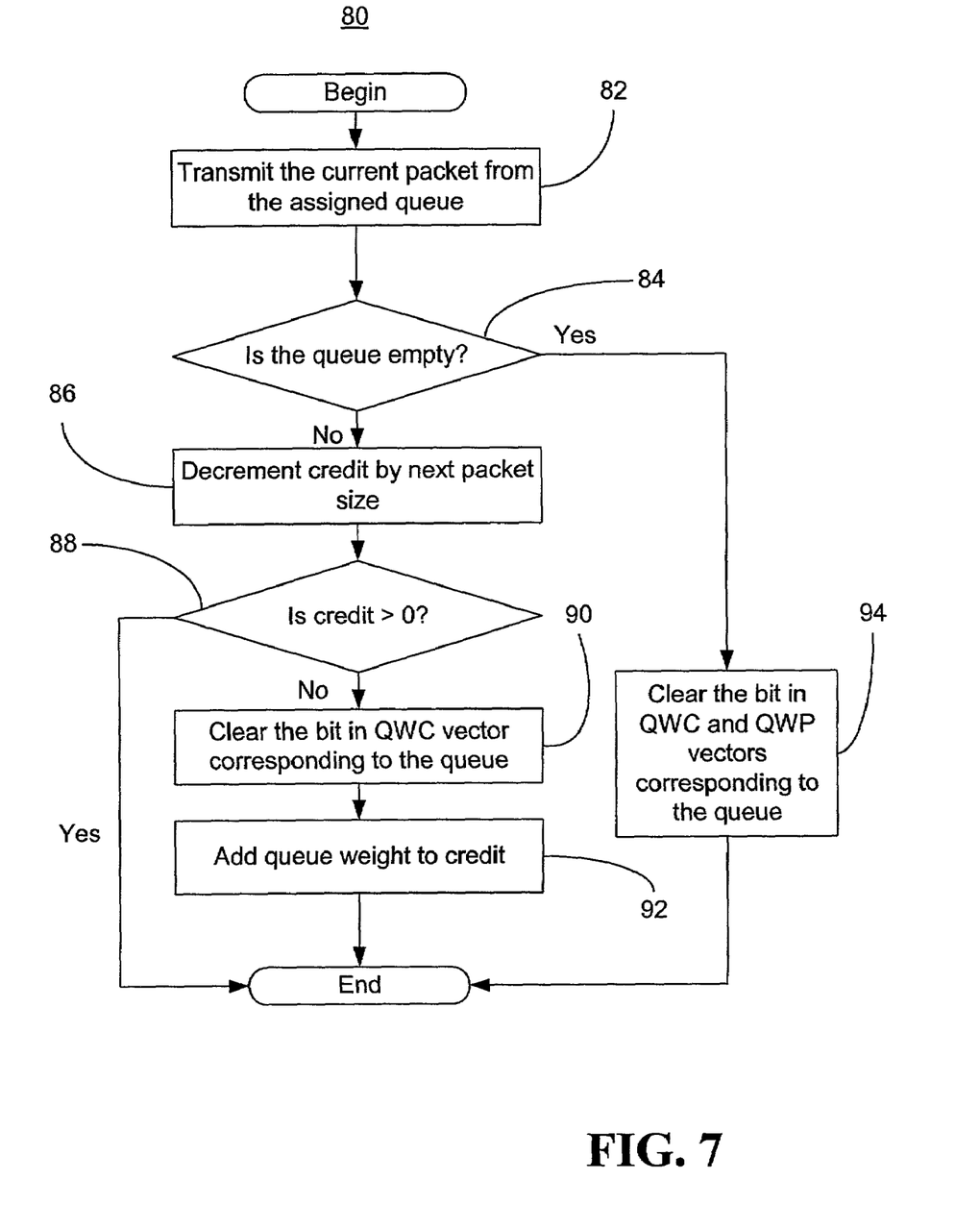
FIG. 7 is a flowchart of an example of a process of updating a queues with credit vector in accordance with one embodiment of the invention.

Turning now to FIG. 7, the transfer of packets using the transmit threads is shown in greater detail at method 80. Each of the plurality of transmit threads implement method 80 in the multi-threaded environment. Block 82 provides for transmitting the current packet from the assigned queue, and block 84 provides for determining whether the queue is empty after the transmission. If not, the credit corresponding to the selected queue decremented by the next packet size at next packet size at block 86. If it is determined at block 88 that the credit for the selected queue is greater than zero, the transmit thread transitions to the end of the procedure. Otherwise, the bit in the QWC vector corresponding to the queue is cleared at block 90, and the queue weight is added to the queue credit at block 92. This indicates that no more packets are to be transmitted from the selected queue in the current round. If it is determined at block 84 that the queue is empty, the bits in the QWC and QWP vectors corresponding to the queue are cleared at block 94.

Figure 8:
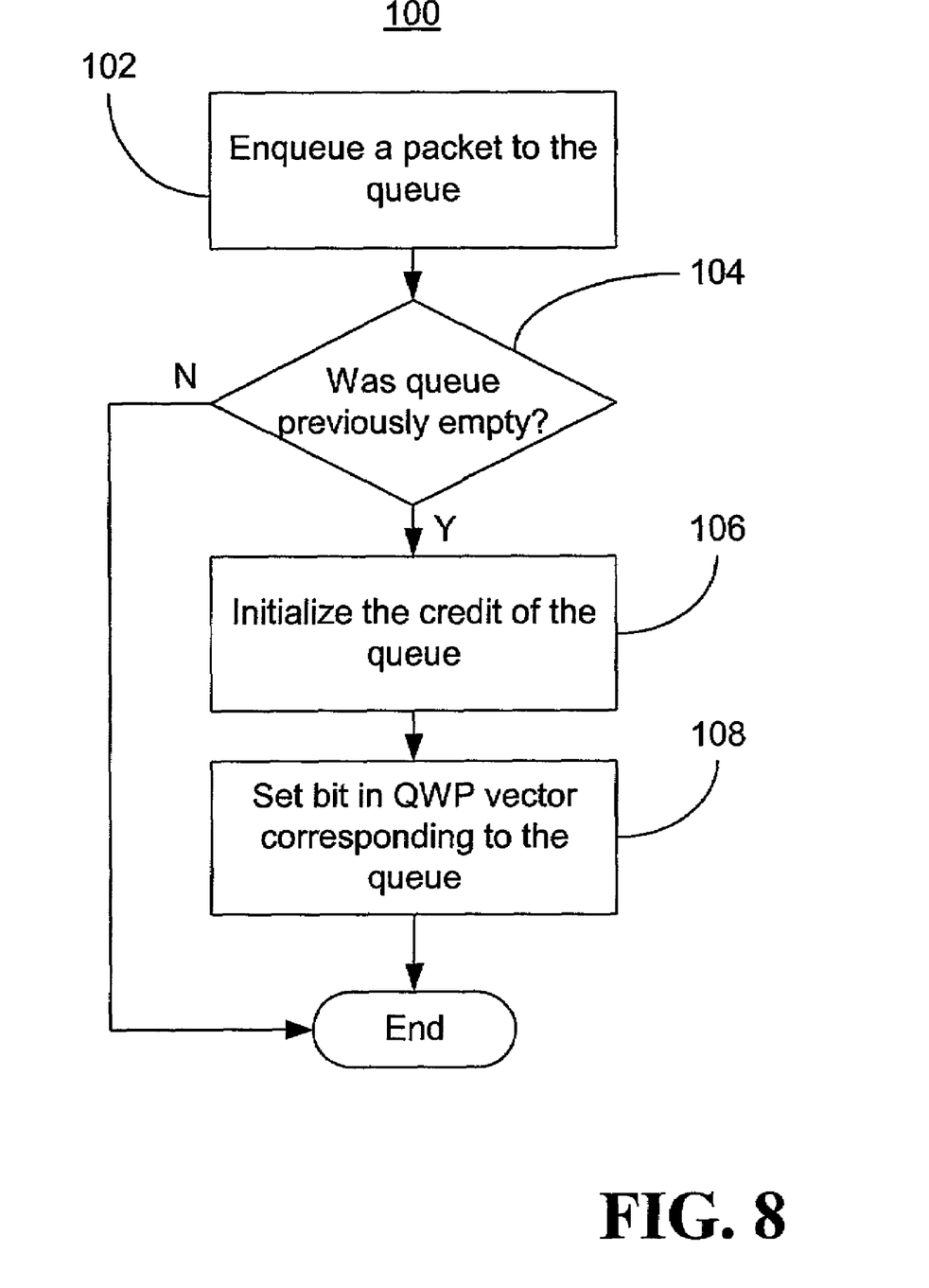
FIG. 8 is a flowchart of an example of a process of receiving packets in accordance with one embodiment of the invention.

Turning now to FIG. 8, one approach to receiving packets is shown in greater detail at method 100. Specifically, processing block 102 provides for enqueuing an incoming packet to the queue. A determination is made at block 104 as to whether the queue was previously empty. If so, the credit of the queue is initialized at block 106, and the appropriate bit is set in the QWP vector at block 108.

Thus each queue can be given a weight and credit field, with the relative weight being proportional to the relative bandwidth for the queue. The credit field is updated with the weight, and is used to determine which packets to schedule next. When the credit becomes negative, no other packets are transmitted from that queue in that round. In addition to the two fields for each queue, embodiments use QWP and QWC vectors for bookkeeping in determining the next packets to send. The use of these two vectors facilitates the distribution of the scheduling tasks among multiple threads for greater overall efficiency. Furthermore, maintaining the vectors in an on-chip memory location significantly improves speed.

Those skilled in the art can now appreciate from the foregoing description that the broad techniques of the embodiments of the present invention can be implemented in a variety of forms. For example, a machine readable medium storing a set of instructions to be executed by a processor could be provided. The instructions, when executed, could cause packets to be transferred from a plurality of queues of a processor first off-chip memory to a transmit buffer using a first transmit thread, and they could cause the packets to be transferred from the plurality of queues to the transmit buffer using a second transmit thread. The transmit threads could transition between the queues in response to depletion of each queue by a weighted amount. Therefore, while the embodiments have been described in connection with particular examples thereof, the true scope of the embodiments of the invention should not be so limited since other modifications will become apparent to the skilled practitioner upon a study of the drawings, specification, and following claims.

What is claimed is:

1. A method of processing packets, comprising:
transferring packets from a plurality of queues of a processor first off-chip memory to a transmit buffer with execution of a first transmit thread;
transferring packets from the plurality of queues to the transmit buffer with execution of a second transmit thread, the transmit threads to transition between the queues in response to a depletion of each queue by a weighted amount; and
using a scheduler threat to select a first queue based on the queues with credit (QWC) vector.

2. The method of claim 1 further including: transferring a first packet from the first queue to the transmit buffer; and reducing a credit descriptor of the first queue by an amount corresponding to a size of the first packet.

3. A method of claim 2 further including: determining whether the reducing causes the credit descriptor of the first queue to be depleted by a first weighted amount; and updating the QWC vector based on the determining.

4. The method of claim 3 wherein the QWC vector is stored in an on-chip memory of the processor.

5. The method of claim 3 further including: toggling a first bit in the QWC vector if the reducing causes the credit descriptor of the first queue to be depleted by the first weighted amount, the QWC vector having a plurality of bits corresponding to the plurality of queues and the first bit corresponding to the first queue; adding a weight descriptor of the first queue to the reduced credit descriptor of the first queue; using the scheduler thread to select a second queue based on the QWC vector; and transferring a second packet from the second queue to the transmit buffer.

6. The method of claim 5 wherein the credit descriptor and the weight descriptor are stored in a second off-chip memory.

7. The method of claim 6 wherein the second off-chip memory is a static random access memory (SRAM).

8. The method of claim 3 further including transmitting a second packet from the first queue to the transmit buffer if the reducing does not cause the credit descriptor of the first queue to be depleted by the first weighted amount.

9. The method of claim 3 further including copying the QWP vector to the QWC vector if the updated QWC vector has a value of zero, the QWP sector to indicate which of the plurality of queues have packets and being stored in an on-chip memory of the processor.

10. The method of claim 1 wherein the first off-chip memory is a dynamic random access memory (DRAM).

11. The method of claim 1 further including using a plurality of receive threads to transfer the packets from a receive buffer to the plurality of queues.

12. The method of claim 11 further including using the receive threads to update a queues with packets (QWP) vector, the QWP vector to indicate which of the plurality of queues have packets.

13. The method of claim 11 wherein each receive thread has a corresponding port assignment.

14. The method of claim 11 wherein a first subset of the plurality of receive threads is part of a first receive micro-engine of the processor and a second subset of the plurality of receive threads is part of a second receive micro-engine of the processor.

15. The method of claim 1 further including selecting each weighted amount based on a type of service associated with a corresponding queue.

16. A method of processing packets, comprising: using a schedule thread to select a first queue from a plurality of queues based on a queues with credit (QWC) vector; transferring a first packet from the first queue to a transmit buffer; reducing a credit descriptor of the first queue by an amount corresponding to a size of the first packet; determining whether the reducing causes the credit descriptor of the first queue to be depleted by a first weighted amount; updating the QWC vector based on the determining; and transferring a second packet from a second queue to the transmit buffer if the reducing causes the credit descriptor of the first queue to be depleted by the first weighted amount.

17. The method of claim 16 further including: toggling a first bit in the QWC vector, the QWC vector having a plurality of bits corresponding to the plurality of queues and the first bit corresponding to the first queue; adding a weight descriptor of the first queue to the reduced credit descriptor of the first queue; and selecting die second queue based on the QWC vector.

18. The method of claim 17 wherein the queues are located in a first off-chip memory, the vector is stored in an on-chip memory, and the credit descriptor is stored in a second off-chip memory.

19. The method of claim 18 wherein the first off-chip memory is a dynamic random access memory (DRAM), the on-chip memory is a processor scratchpad memory, and the second off-chip memory is a static RAM (SRAM).

20. The method of claim 16 further including transferring the second packet from the first queue to the transmit butter if the reducing does not cause the credit descriptor of the first queue to be depleted by the first weighted amount.

21. The method of claim 16 further including using a plurality of receive threads to transfer the packets from a receive buffer to the plurality of queues.

22. The method of claim 21 further including using the receive threads to update a queues with packets (QWP) vector, the QWP vector to indicate which of the plurality of queues have packets and being stored in an on-chip memory of a processor.

23. A processor comprising:
a transmit buffer;
a plurality of transmit threads to transfer packets from a plurality of queues of a first off-chip memory to the transmit buffer, the transmit threads to transition between the queues in response to a depletion of the queues by weighted amounts; and
an on-chip memory to queues with packets (QWP) vector and a queues with credit (QWC) vector, each vector having a plurality of bits corresponding to the plurality of queues.

24. The processor of claim 23 further including a scheduler thread to select transmit threads for packet transmission.

25. The processor of claim 23 further including: a receive buffer; and a plurality of receive threads to transfer the packets from the receive buffer to the plurality of queues, and to update a queues with packets (QWP) vector.

26. The processor of claim 25 wherein a first subset of the plurality of receive threads is part of a first receive micro-engine and a second subset of the plurality of receive threads is part of a second receive micro-engine.

27. The processor of claim 23 wherein a first subset of the plurality of transmit threads is part of a first transmit micro-engine and a second subset of the plurality of transmit threads is part of a second transmit micro-engine.

28. A networking architecture comprising:
a first off-chip memory having a plurality of queues;
a second off-chip memory to store a credit descriptor and a weight descriptor for each queue, the weight descriptors to define weighted amounts and the credit descriptors to indicate whether the queues have been depleted by the weighted amounts; and
a processor operatively coupled to the first off-chip memory and the second off-chip memory, the processor including a transmit buffer and a plurality of transmit threads to transmit packets from the queues to the transmit buffer, the transmit threads to transition between the queues in response to a depletion of the queues by the weighted amounts, the processor further includes an on-chip memory to store a queues with packets (QWP) vector and a queues with credit (QWC) vector, each vector having a plurality of bits corresponding to the plurality of queues.

29. The architecture of claim 28 wherein the processor further includes a scheduler thread to select transmit threads for packet transmission.

30. The architecture of claim 28 wherein the processor further includes: a receive buffer; and a plurality of receive threads to transmit the packets from the receive buffer to the plurality of queues, and to update a queues with packets (QWP) vector.

31. A computer readable medium storing a set of instructions to be executed by a processor to:
transfer packets from a plurality of queues of a processor first off-chip memory to a transmit buffer using a first transmit thread; and
transfer packets from the plurality of queues to the transmit buffer using a second transmit thread, the transmit threads to transition between the queues in response to depletion of each queue by a weighted amount, the instructions are to be executed to use a scheduler thread to select a first queue based on a queues with credit (QWC) vector.

32. The medium of claim 31 wherein the instructions are further capable of being executed to: transfer a first packet from the first queue to the transmit buffer; and reduce a credit descriptor of the first queue by an amount corresponding to a size of the first packet.

33. The medium of claim 32 wherein the instructions are to be executed to: determine whether the reducing causes the credit descriptor of the first queue to be depleted by a first weighted amount; and update the QWC vector based on the determining.

* * * * *